(12) United States Patent
Morimoto et al.

(10) Patent No.: US 10,026,038 B2
(45) Date of Patent: Jul. 17, 2018

(54) INFORMATION PROCESSING SYSTEM FOR IDENTIFYING USED COMMODITIES IN DOMESTIC ELECTRICAL APPLIANCES, AND SECURITY SYSTEM

(71) Applicant: Panasonic Intellectual Property Corporation of America, Torrance, CA (US)

(72) Inventors: Takashi Morimoto, Osaka (JP); Yasuhiro Yuki, Kanagawa (JP); Masao Nonaka, Osaka (JP); Kazunori Okubo, Hyogo (JP); Mina Shimizu, Kanagawa (JP); Hidekatsu Kanemoto, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 558 days.

(21) Appl. No.: 14/428,668

(22) PCT Filed: May 16, 2014

(86) PCT No.: PCT/JP2014/002585
§ 371 (c)(1),
(2) Date: Mar. 17, 2015

(87) PCT Pub. No.: WO2014/196130
PCT Pub. Date: Dec. 11, 2014

(65) Prior Publication Data
US 2015/0248612 A1 Sep. 3, 2015

Related U.S. Application Data

(60) Provisional application No. 61/830,737, filed on Jun. 4, 2013.

(51) Int. Cl.
*G06N 5/04* (2006.01)
*G06K 9/00* (2006.01)
(Continued)

(52) U.S. Cl.
CPC ......... *G06N 5/04* (2013.01); *G06F 17/30277* (2013.01); *G06K 9/00* (2013.01);
(Continued)

(58) Field of Classification Search
CPC ...................................................... G06N 99/00
See application file for complete search history.

(56) References Cited

U.S. PATENT DOCUMENTS

| | | | | |
|---|---|---|---|---|
| 2006/0111811 | A1* | 5/2006 | Okamoto | B25J 5/007 700/214 |
| 2012/0050018 | A1* | 3/2012 | Sajadi | H04M 1/7253 340/10.1 |

FOREIGN PATENT DOCUMENTS

| | | |
|---|---|---|
| EP | 1770537 | 4/2007 |
| JP | 10-009753 | 1/1998 |

(Continued)

OTHER PUBLICATIONS

International Search Report of PCT application No. PCT/JP2014/002585 dated Aug. 26, 2014.

*Primary Examiner* — Vincent Gonzales
(74) *Attorney, Agent, or Firm* — Greenblum & Bernstein, P.L.C.

(57) ABSTRACT

The present disclosure provides an information processing system including a recognition database generated from information on an article, wherein the article is associated with a home electric device, and the information processing system performs a matching process against the recognition database on the basis of article-use detection information provided by the home electric device with which the article is associated, and identifies an article used in the home electric device. With the configuration described above, on the basis of a recognition database generated from information on a purchased article and on the basis of article-use detection information of a home electric device associated
(Continued)

with a purchaser of the purchased article, an article used in the home electric device can be identified.

10 Claims, 14 Drawing Sheets

(51) Int. Cl.
| | | |
|---|---|---|
| *G06F 17/30* | (2006.01) | |
| *H04L 29/08* | (2006.01) | |
| *G06Q 10/10* | (2012.01) | |
| *G06Q 30/06* | (2012.01) | |
| *G06Q 50/10* | (2012.01) | |
| *G06N 99/00* | (2010.01) | |
| *G10L 15/00* | (2013.01) | |

(52) U.S. Cl.
CPC ............ *G06Q 10/10* (2013.01); *G06Q 30/06* (2013.01); *G06Q 50/10* (2013.01); *H04L 67/12* (2013.01); *G06N 99/00* (2013.01); *G10L 15/00* (2013.01)

(56) References Cited

FOREIGN PATENT DOCUMENTS

| | | |
|---|---|---|
| JP | 2002-092308 | 3/2002 |
| JP | 2004-013871 | 1/2004 |
| WO | 2006/006576 | 1/2006 |

\* cited by examiner

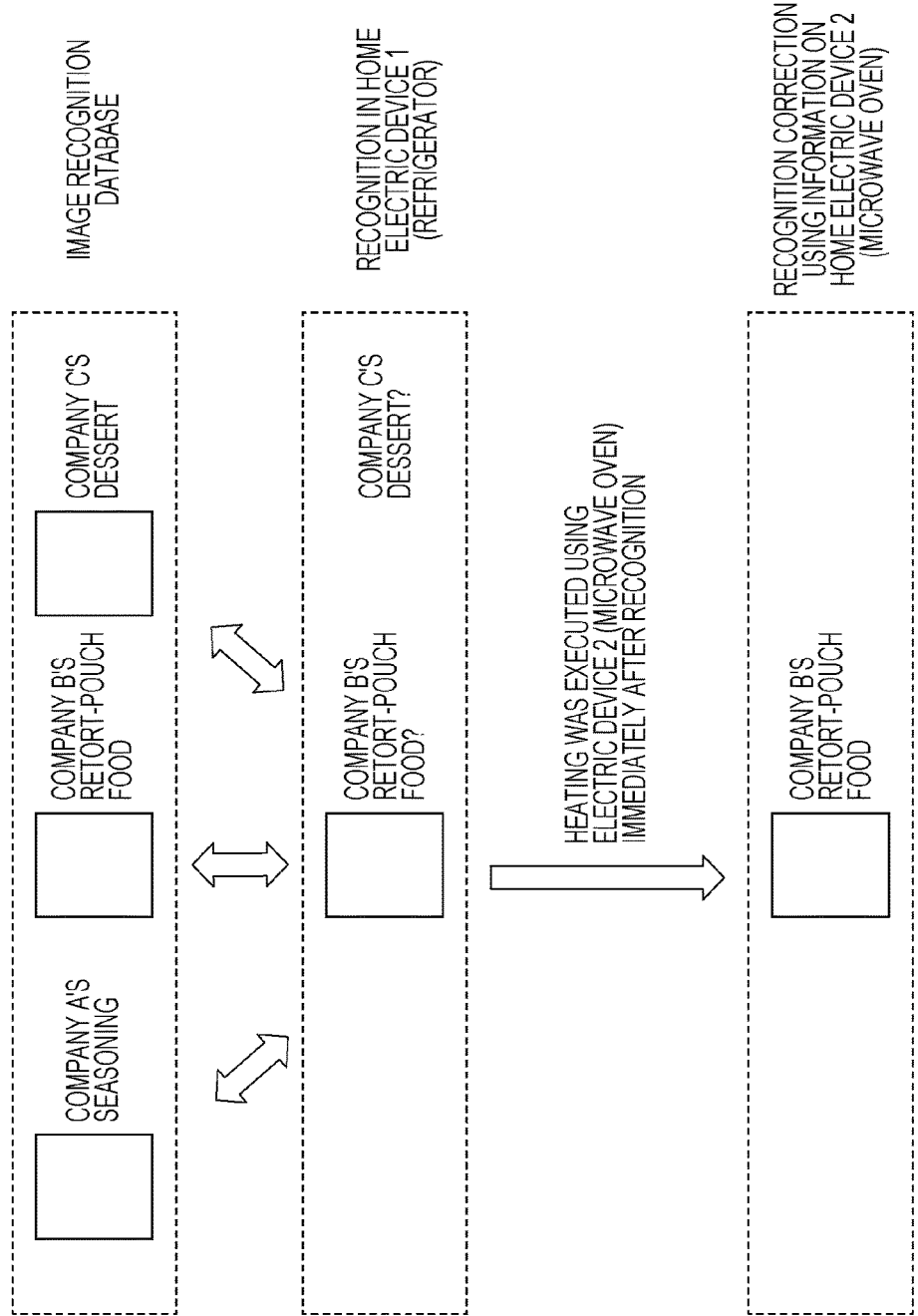

FIG. 9

| ITEMS | HOME APPLIANCE ATTRIBUTE 1 (TYPE) | HOME APPLIANCE ATTRIBUTE 2 (REFRIGERATION/ FREEZING) | DIMENSIONS | ... |
|---|---|---|---|---|
| CARROT | REFRIGERATOR | REFRIGERATION | 20 cm × 2 cm | ... |
| COMPANY A'S SEASONING | REFRIGERATOR | REFRIGERATION | 15 cm × 15 cm | ... |
| COMPANY B'S RETORT-POUCH FOOD | REFRIGERATOR MICROWAVE OVEN | FREEZING | 15 cm × 15 cm | ... |
| COMPANY C'S DESSERT | REFRIGERATOR | REFRIGERATION | 15 cm × 15 cm | ... |
| COMPANY D'S DETERGENT | WASHING MACHINE | × | 30 cm × 5 cm | ... |
| COMPANY E'S CLEANER BAG | CLEANER | × | 15 cm × 15 cm | ... |

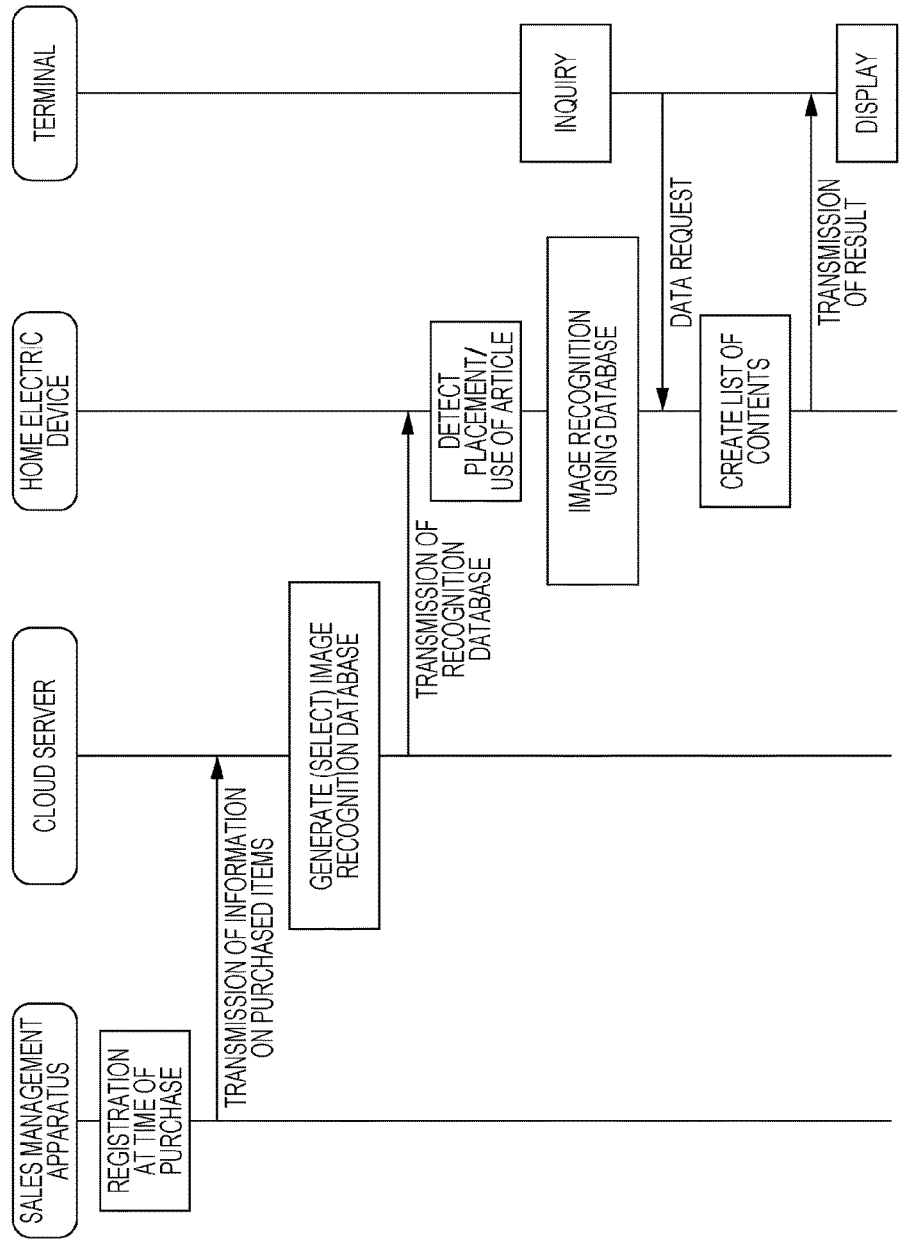

INFORMATION PROCESSING SYSTEM FOR IDENTIFYING USED COMMODITIES IN DOMESTIC ELECTRICAL APPLIANCES, AND SECURITY SYSTEM

TECHNICAL FIELD

The present disclosure relates to an information processing system for identifying an article used in a home electric device, and to a crime-deterrent system.

BACKGROUND ART

Home electric devices such as washing machines and refrigerators are related to various daily necessities, such as detergents and food products, and food products. For example, washing machines require clothing detergents and fabric softeners for laundry use, and refrigerators store food products such as beef and eggs in them. It is possible for home electric devices to identify such articles, making various services using the home electric devices feasible. For instance, it is possible to perform automatic setting of a laundry course suitable for the laundry detergent to be used, to check food products in refrigerators to recommend a food recipe, or to establish other services.

However, current home electric devices are not capable of identifying such articles or identifying the timing of use of the articles.

It is common to utilize camera-based image recognition to automatically identify various articles (for example, PTL 1).

CITATION LIST

Patent Literature

PTL 1: Japanese Unexamined Patent Application Publication No. 10-9753

SUMMARY OF INVENTION

An information processing system according to an aspect of the present disclosure includes a recognition database generated from information on a purchased article, the purchased article is associated with a home electric device, and the information processing system performs a matching process against the recognition database on the basis of article-use detection information provided by the home electric device with which the purchased article is associated, and identifies an article used in the home electric device.

With the configuration described above, on the basis of a recognition database generated from information on a purchased article and on the basis of article-use detection information of a home electric device associated with a purchaser of the purchased article, an article used in the home electric device can be identified.

These general or specific aspects may be implemented using a system, a method, an integrated circuit, a computer program, or a recording medium, or may be implemented using any combination of a system, an apparatus, a method, an integrated circuit, a computer program, and a recording medium.

BRIEF DESCRIPTION OF DRAWINGS

FIG. 8 is a diagram illustrating the flow for a recognition process in Embodiment 3 of the present disclosure.

FIG. 9 is a diagram illustrating a table in a recognition database in Embodiment 3 of the present disclosure.

FIG. 13 is a diagram illustrating a processing flow in a modification/application of the present disclosure.

DESCRIPTION OF EMBODIMENTS

First, a description will be given of matters studied by the inventors before the inventors made some aspects of the invention disclosed herein.

The accuracy of image recognition is an issue in a case where diverse articles such as food products are targets. There are several reasons for this. One of the reasons is that there are cases, such as a case where there are articles having similar appearances, such as mandarin orange and citrus junos, or a case where there is an article that has its shape changed as a result of being processed, such as a watermelon being cut into ⅓ or ⅛. Another reason is that an increase in the size of a recognition database against which a recognition target article is to be matched, that is, an increase in matching target size because the recognition candidates are all foods, results in an increase in recognition errors.

In addition, unlike refrigerators where users desire to view the contents, devices such as washing machines would be equipped with a camera for only the purpose of identifying a detergent, and it is difficult for such devices to have a camera for image recognition because of the cost.

Embodiment 1

Figure 1:
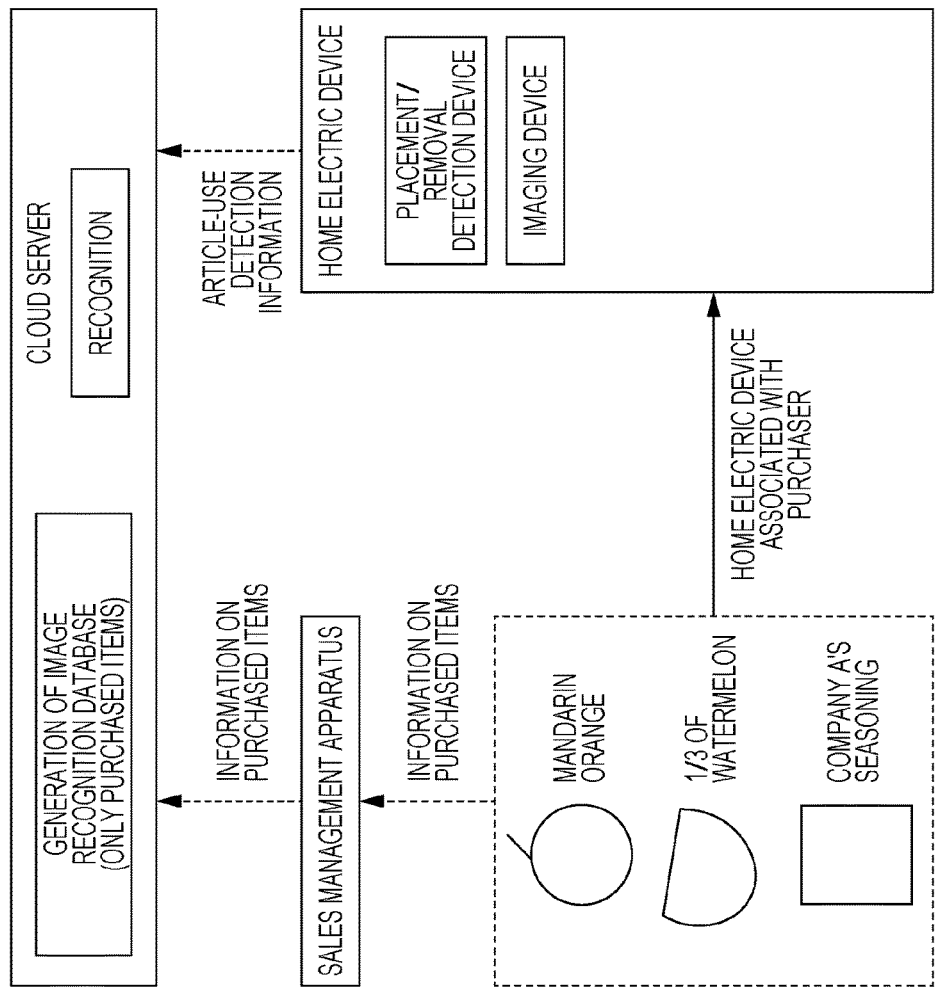
FIG. 1 is a diagram illustrating a configuration and processing flow in Embodiment 1 of the present disclosure.

FIG. 1 is a diagram illustrating the configuration and processing flow of an information processing system according to Embodiment 1 of the present disclosure. It is assumed that a user purchased three items, for example, "mandarin orange, ⅓ of watermelon, and Company A's seasoning", in a retailer such as a supermarket. In this case, accounting information in a sales management apparatus (such as a cash register or a POS system) in it is used to transmit information on the articles purchased in the retailer to the cloud server side. The information on the purchased articles is associated with information on the user who purchased the articles (hereinafter also referred to as a purchaser). The cloud server generates an image recognition database including only the items purchased by the user as reference data. The process for generating the image recognition database imposes limitations on an object to be recognized. Thus, the probability that even an article having a similar appearance, such as citrus junos or mandarin orange, will be erroneously recognized is reduced.

Then, a home electric device detects the use of an article. The home electric device is associated with the information on the user who purchased the articles. The illustrated example assumes a refrigerator, by way of example. In the case of a refrigerator, the use of an article is detected when the article is placed into the refrigerator or is removed from the refrigerator. The detection of the use of an article is performed by an imaging device such as a camera included in the home electric device, and an image of the article put into or removed from the refrigerator is output as article-use detection information.

There are some conceivable methods for associating information on a purchased article and a home electric device. One method is, for example, to perform association using a personal ID such as member information. In a supermarket or a convenience store, it is common to hand out a member card or the like to award a point bonus at the time of purchase of articles, and the personal ID of such card information as above is generally associated with list information of the purchased articles. Associating the personal ID and the device ID of the home electric device with each other in advance achieves association between the home electric device and the purchased articles. In addition to this, a unique ID associated with information on a purchased article may be issued during a purchase process. In this case, when performing a purchase process, the sales management apparatus issues a unique ID and prints the unique ID on each receipt. There are some means for achieving the unique ID, such as a two-dimensional barcode or a number. The information on the unique ID and information on a purchased article associated therewith are transmitted to the cloud server side. The user who purchased the article scans a receipt having the unique ID printed thereon by using a camera of a home electric device after they come back home. Instead of scanning, the user may enter a number by hand. The home electric device acquires information on the purchased article corresponding to the scanned unique ID from the cloud server.

Finally, the image of the article put into or removed from the refrigerator, which is article-use detection information, is transmitted to the cloud server. After that, an image recognition process is performed on the cloud server side. In this case, matching is performed only on an article having the closest feature value among the articles in the image recognition database which include only the above-described purchased items.

The matching process portion of the image recognition database, which is a feature of the present disclosure, will be described with reference to conceptual diagrams in FIG. 2 and FIG. 3. In the example in FIG. 2, image recognition is targeted for all general use foods, and an image recognition database having a sufficiently large size to include all the foods accordingly is prepared. For this reason, for example, various portions of watermelon per type of watermelon are registered as reference data. In addition, the image recognition involves pattern matching with all the pieces of registered data in the image recognition database. In other words, there are a large number of candidates for the correct answer, and a correct recognition result is difficult to obtain. Furthermore, it is necessary to increase the performance of the cloud server in order to further obtain the recognition process response, resulting in a tendency for cost to increase.

Figure 2:
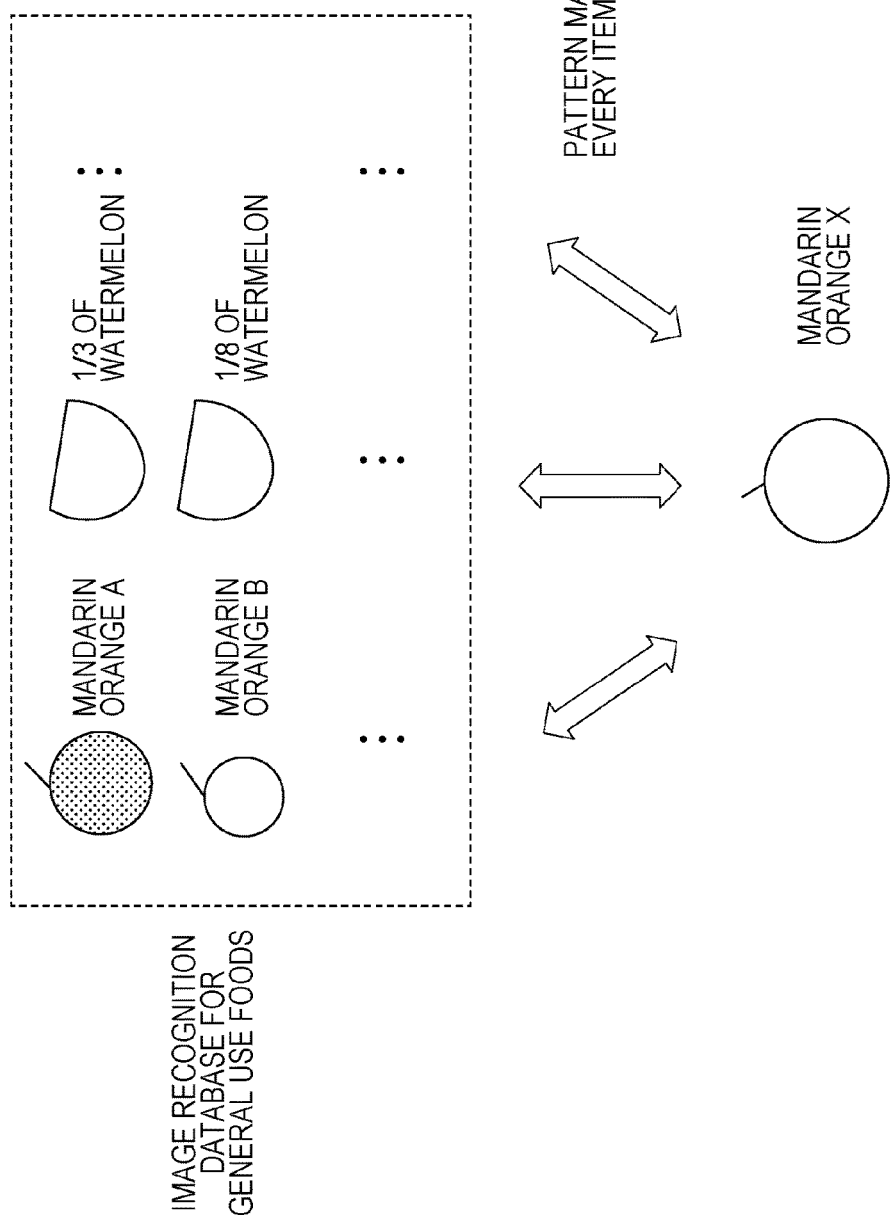
FIG. 2 is a diagram illustrating a database matching process using image recognition, which is targeted for all general use foods.
Figure 3:
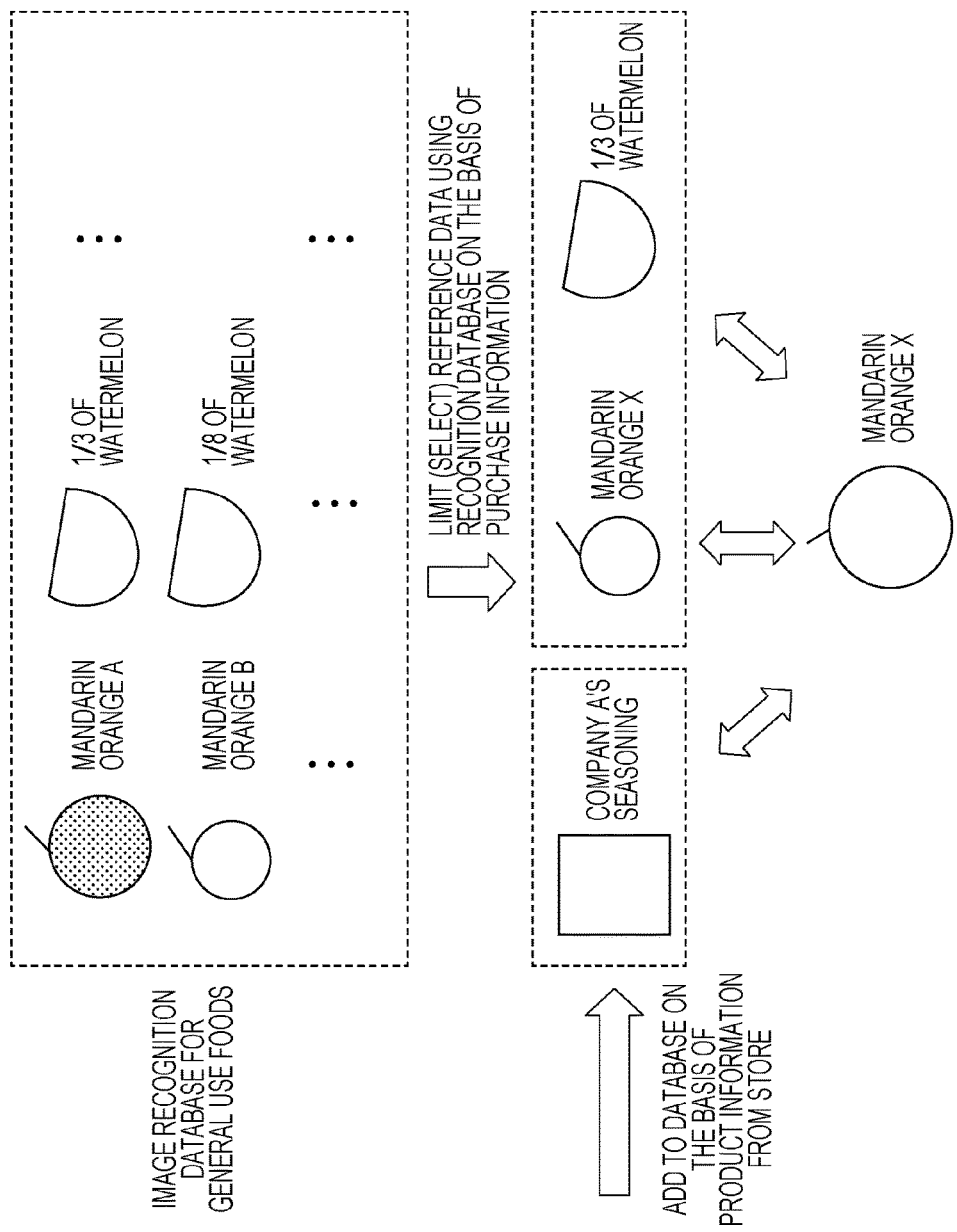
FIG. 3 is a diagram illustrating a database matching process in Embodiment 1 of the present disclosure.

As in FIG. 3, in the case of the present disclosure, unlike the case in FIG. 2, it is possible to limit registered data, which serves as a reference, using the image recognition database on the basis of purchase information. This reduces the number of items that have similar appearances and that are difficult to recognize, and enables high-accuracy recognition. An item that has yet to be placed in the image recognition database for general use foods, such as a new product, may be added to the image recognition database on the basis of product information obtained from a store. In addition, for items that are not general high-volume production items, in particular, items like delicatessen foods prepared in-store, items for which the package and the contents are completely different, and the like, images of the products themselves that are actually sold in the store, or the image of similarly processed or packaged goods of the same kind, as a typical one, may be registered in the image recognition database. In addition, in the case of an object to be recognized which has its shape changed between before it is removed from the refrigerator and when it is used and stored in the refrigerator, like fruits that can be cut, an image recognition database regarding such an object may be reconstructed using an image obtained when the object is stored. In the manner described above, an image recognition database can be created on the basis of the image of a purchased article or on the basis of the image of an item processed or packaged similarly to a purchased article. Thus, more accurate recognition results can be obtained for image recognition.

Note that information registered in the image recognition database is automatically deleted when the corresponding article is used. As an example, in the case of each article past its best-before date, it may be determined that recognition is no longer necessary because the article has been used or cannot be used, and the corresponding information may be deleted from the image recognition database. Additionally, in the case where goods that need to be kept refrigerated have been detected to have been removed from the refrigerator, and have been left out of the refrigerator for a day or longer, it may be determined that the article can no longer be used, and the corresponding information may be deleted. In addition, the user may make the input that an article has been used, manually such as by audio or by operating a device, and information on a frozen food product or the like may be automatically deleted upon detection of the frozen food product or the like having been used in a microwave oven.

Embodiment 2

Figure 4:
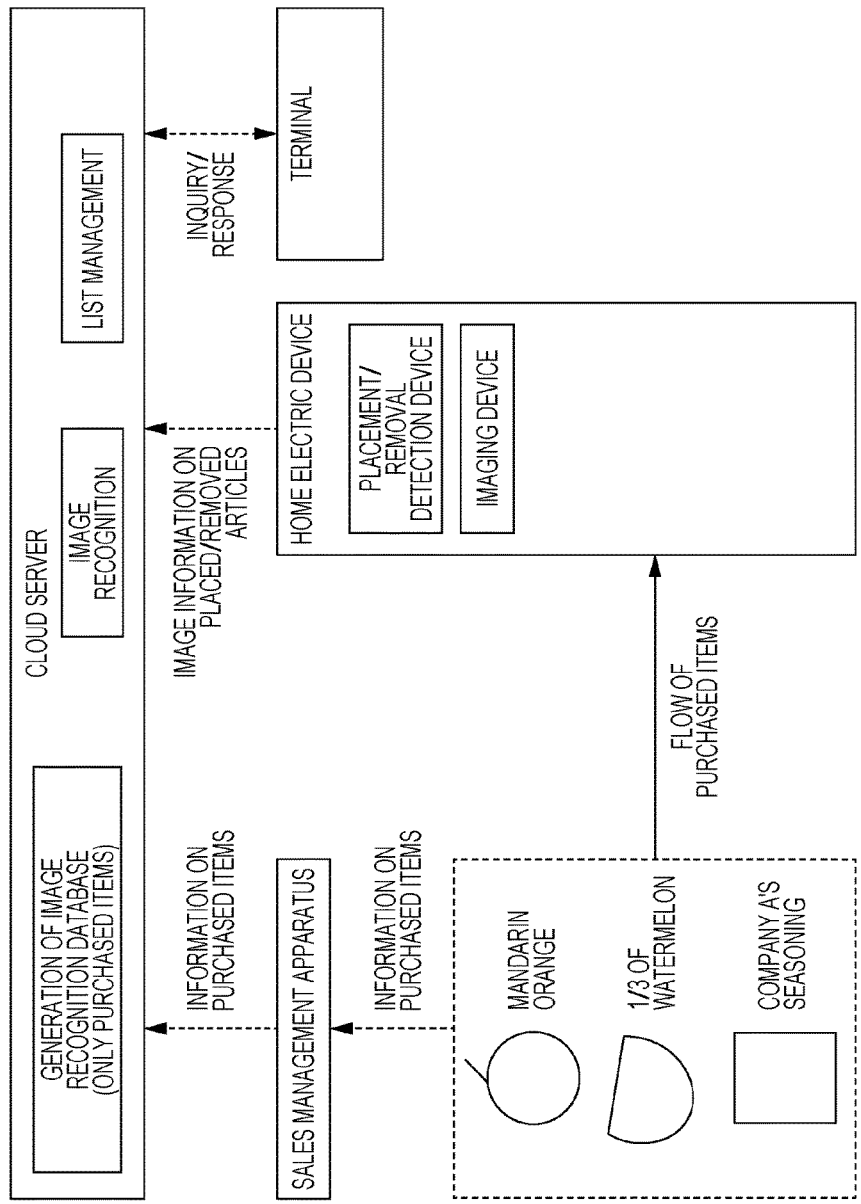
FIG. 4 is a diagram illustrating a configuration and processing flow in Embodiment 2 of the present disclosure.

FIG. 4 is a diagram illustrating the configuration and processing flow of an information processing system according to a second embodiment of the present disclosure. The illustrated example shows the configuration of an information processing system that allows a list of contents of the refrigerator to be checked using a terminal. In the following, a description of element portions similar to those in Embodiment 1 is omitted, and only a portion specific to this embodiment will be described.

In the present disclosure, a description is given taking as an example a process for acquiring a list of contents stored in a home electric device such as a refrigerator from a terminal such as a smartphone. To this end, the cloud server recognizes an article removed from the refrigerator, and manages a list of contents. In response to an inquiry from the terminal, the cloud server sends a listing of the managed contents in the refrigerator.

Figure 5:
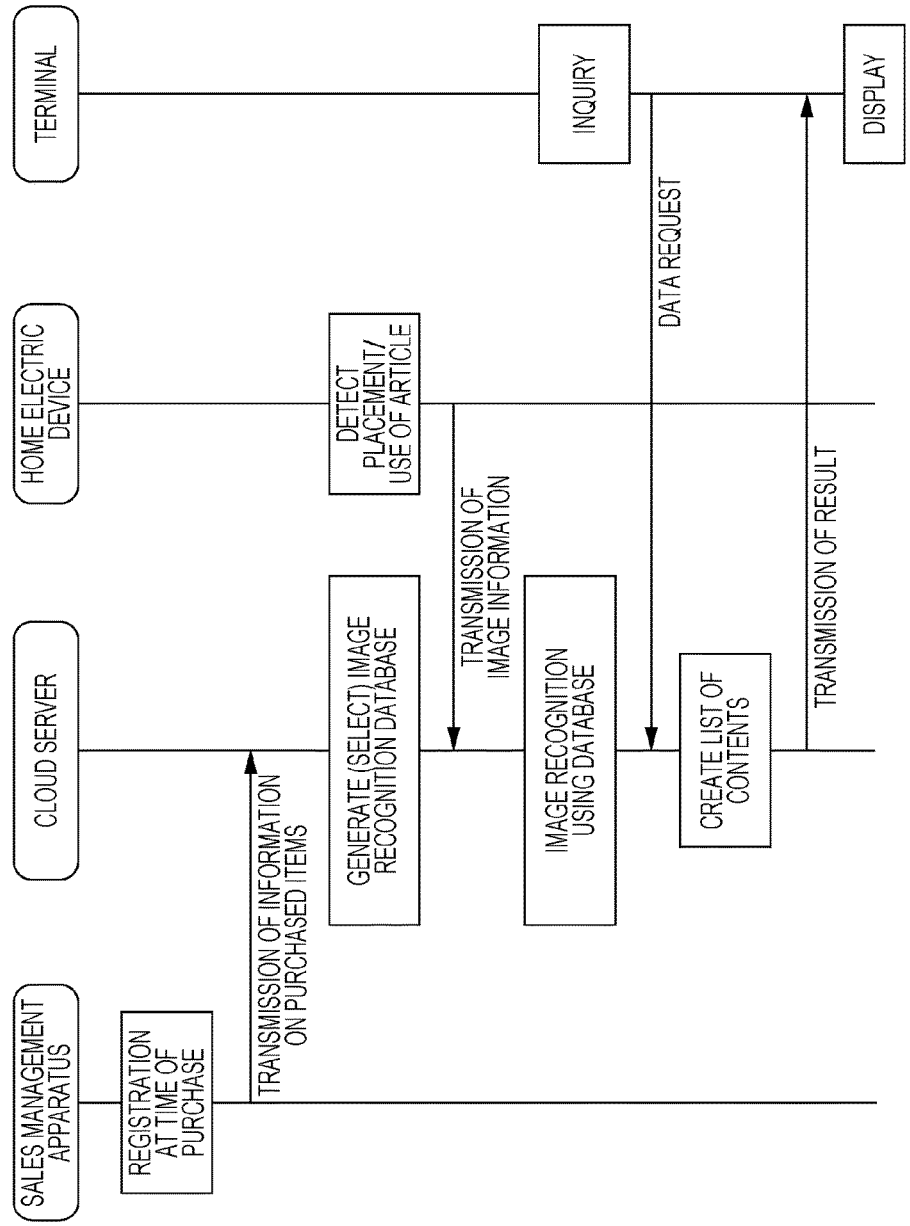
FIG. 5 is a diagram illustrating the processing flow in Embodiment 2 of the present disclosure.

FIG. 5 is a diagram illustrating a processing flow of the system. First, a sales management apparatus, such as a cash register, in a retailer performs a process for registration at the time of purchase. The process for registration at the time of purchase may be targeted for the same data as information on the accounting for general stores. Alternatively, data obtained by erasing the price of a purchased item or information on the image of a purchased item itself may be used. It may be sufficient that any information capable of identifying a purchased article is used. Through the process for registration at the time of purchase, information on an item purchased by the user is transmitted to the cloud server. For an item such as a new product or an item processed in-store, like a delicatessen product, an image or metadata for image recognition (such as color and/or shape) may also be sent.

Figure 6A:
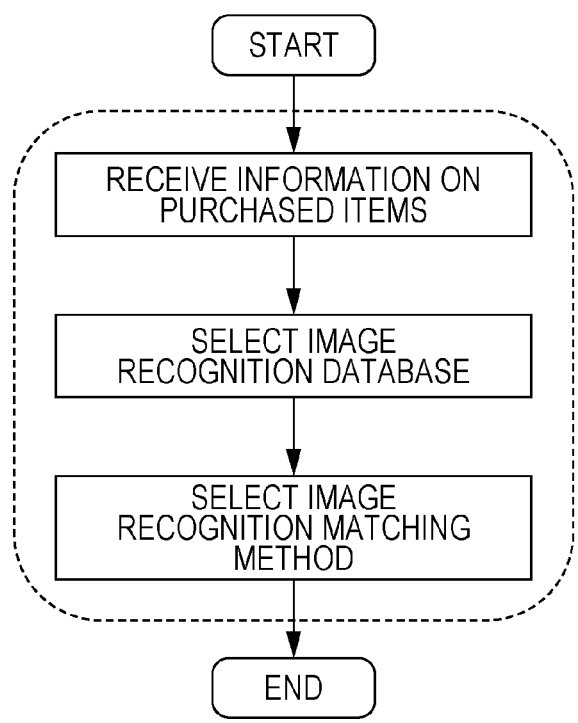
FIG. 6A is a diagram illustrating the flow for generating a database in Embodiment 2 of the present disclosure.

On the cloud server side, an image recognition database generation (selection) process is performed on the basis of the list information. The image recognition database generation (selection) process is further composed of processing steps illustrated in FIG. 6A. First, the cloud server receives information on purchased items, and determines articles included in an image recognition database to be generated. Then, on the basis of an existing general image recognition database, the cloud server selects only the previously acquired information on the purchased articles from within the image recognition database to generate an image recognition database. In this case, a product processed in a store such as a delicatessen, which is not present in the existing image recognition database, may be newly added to the image recognition database (FIG. 3). Finally, the cloud server selects an image recognition matching method. For example, if the generated image recognition database includes only objects having the same shape but different colors, such as "apple" and "mandarin orange", it may be sufficient to use pattern matching only by using the color feature values of those objects. Further, if only objects having the same shape but different sizes, such as "watermelon" and "citrus sudachi", are included, it may be sufficient to perform matching only by using size feature values. Needless to say, it is necessary to select a recognition method also using information on articles that have previously been stored in the refrigerator. An image recognition database generated in the manner described above, and a selected image recognition matching method that is optimized therefor enable image recognition with high accuracy and a small amount of processing.

Then, placement of an article and/or use of an article is detected on the home electric device side. In this case, image information of a recognition target article is transmitted to the cloud server. In this case, for example, in the case of a refrigerator, an imaging device monitors the refrigerator door to detect placement and/or use of an article. If the opening and closing of the door occur, it may be determined that placement and/or use of an article has occurred, and detection information may be generated. Furthermore, a washing machine may also detect placement of an article and/or use of an article for the article, that is, a detergent or a fabric softener, in response to a "laundry" menu having been used.

Figure 6B:
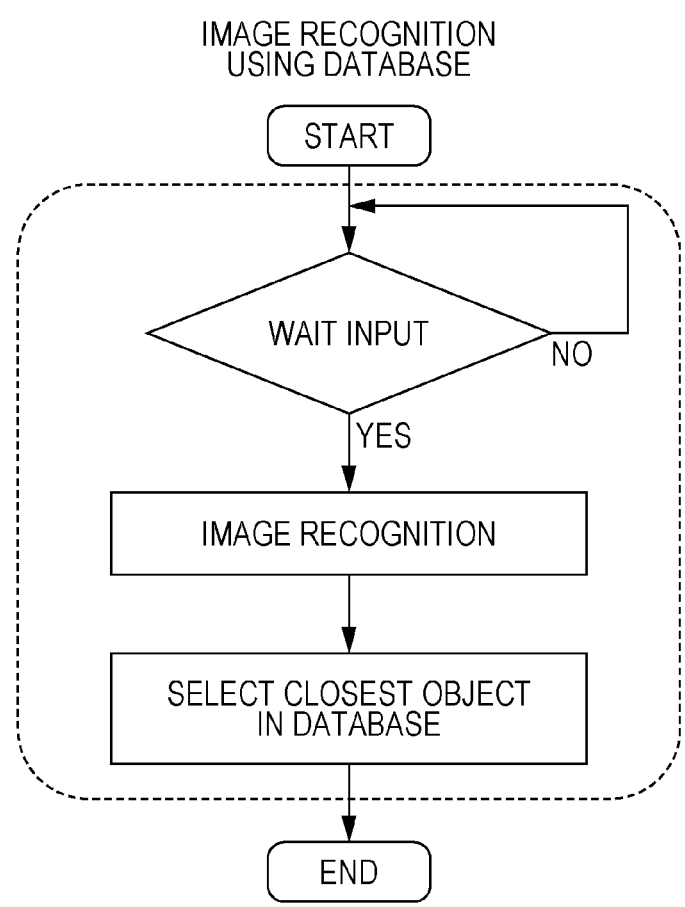
FIG. 6B is a diagram illustrating the flow for an image recognition process in Embodiment 2 of the present disclosure.

The cloud server performs an image recognition process illustrated in FIG. 6B on the basis of the image recognition database and on the basis of image information sent from the home electric device. The cloud server side waits for input to be entered from the home electric device. Upon receipt of input from the home electric device while waiting for input, the cloud server performs an image recognition process. The method for image recognition may be based on that determined in, as described above, the image recognition database generation (selection) process, or based on a statically predetermined method. Finally, the cloud server selects an object in the image recognition database having the closest feature value among the recognition results. Data of the article used in the home electric device, which is obtained through the process described above, is accumulated in the cloud server.

When a data request indicating an inquiry about a list of contents of the refrigerator is issued from the terminal side to the cloud server by using a smartphone application, a list of contents is created on the cloud server side. This process is a process for creating a listing to allow the user to check a list of articles. For example, HTML is generated. The generated result is transmitted to the terminal side, and is displayed on a browser application on the terminal side.

Embodiment 3

Figure 7:
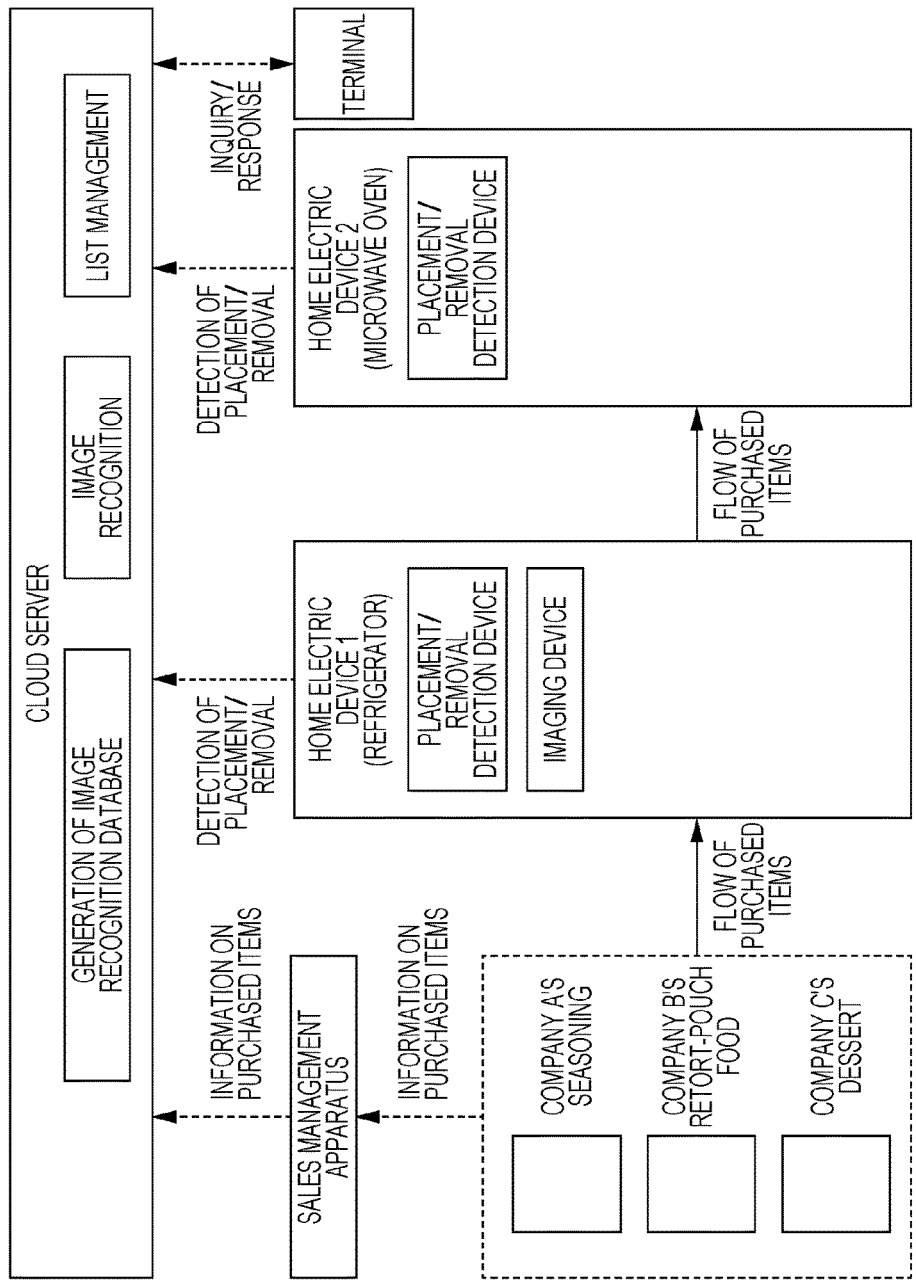
FIG. 7 is a diagram illustrating a configuration and processing flow in Embodiment 3 of the present disclosure.

FIG. 7 is a diagram illustrating the configuration and processing flow of an information processing system according to a third Embodiment 3 of the present disclosure. The differences from the second embodiment illustrated in FIG. 4 are that the presence or absence of home appliance attributes on the image recognition database, and recognition performed using placement or removal detection information provided by a plurality of home electric devices.

In the example in FIG. 7, data of two home electric devices is used. In the following, the two home electric devices will be described as a refrigerator and a microwave oven. In this figure, the articles that the user first purchased in the supermarket are "Company A's seasoning, Company B's retort-pouch food, and Company C's dessert". It is assumed here that these packages have similar appearances, and are difficult to recognize in camera capture conditions. In there conditions, the accuracy of image recognition becomes an issue, for example, if image recognition is based on only a camera image. In contrast, as in this embodiment, a combination of each home electric device that is actually used and a home appliance attribute assigned in the image recognition database can increase recognition accuracy.

A description will be given of a case where, for example, as in FIG. 8, Company B's retort-pouch food is removed from the refrigerator and is immediately thereafter heated in the microwave oven. In this embodiment, a feature value in the image recognition database includes a home appliance attribute. As an example, a table in an image recognition database in FIG. 9 is illustrated. In the illustrated table, the names of objects obtained as recognition results are shown as the item name, and their feature value data includes information such as home appliance attribute 1, home appliance attribute 2, and dimensions. Additional feature values, such as color, printed text on the package, and barcode may be used. The home appliance attribute 1 indicates information on a home appliance in which the corresponding article might be used. For example, among "Company A's seasoning, Company B's retort-pouch food, and Company C's dessert", only Company B's retort-pouch food might be used in both the refrigerator and the microwave oven. Thus, if removal of an article from the refrigerator is detected and then placement of the article into the microwave oven is detected, it can be determined that the article might be Company B's retort-pouch food.

As described above, when placement and/or removal is detected at a home electric device, home appliance attribute information and use information indicating in which home electric device the article has been used are also used as feature values in the recognition process, achieving higher recognition accuracy.

(Modifications, Applications)

Figure 10:
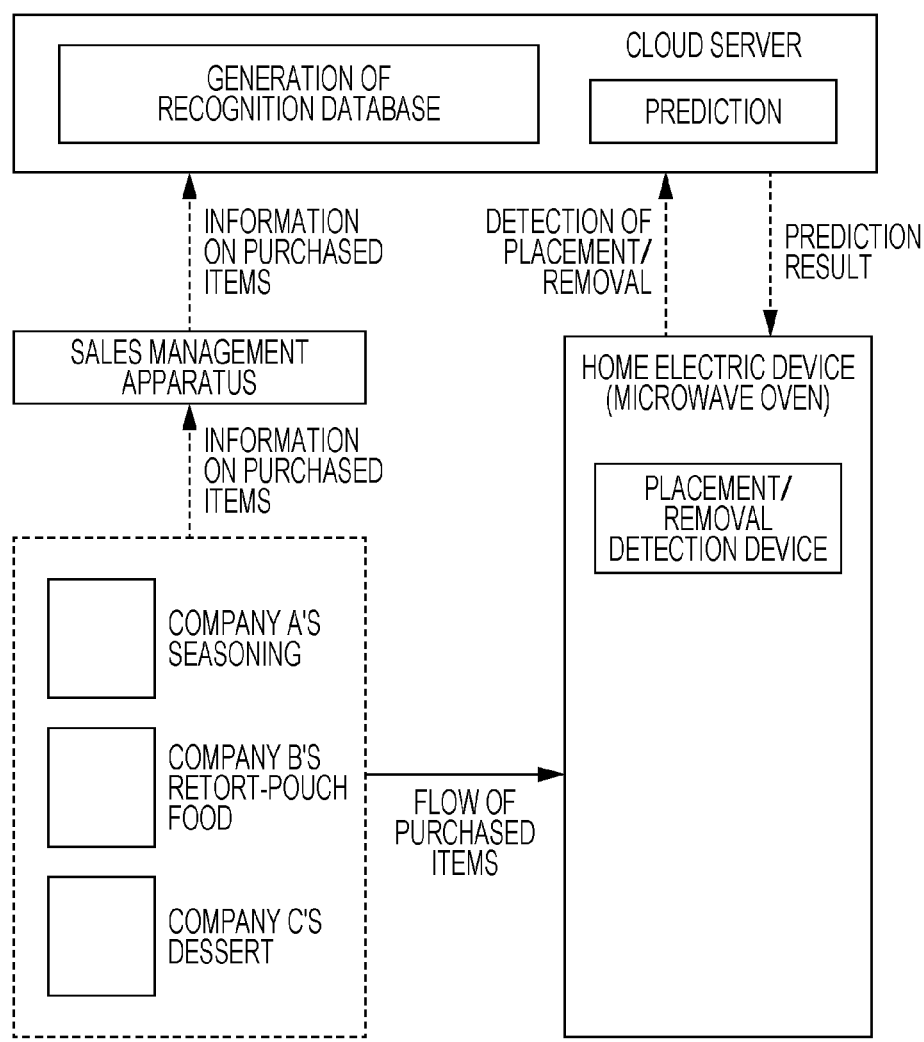
FIG. 10 is a diagram illustrating a configuration and processing flow in a modification/application of the present disclosure.

If a home electric device has no recognition function, the configuration in Embodiment 3 may be used as a prediction mechanism for predicting an article that has been placed. FIG. 10 is a diagram illustrating a configuration and processing flow for use in a microwave oven without the image recognition function. For example, in the example in FIG. 9, among the purchased items of the user, which are "Company A's seasoning, Company B's retort-pouch food, and Company C's dessert", only Company B's retort-pouch food has a home appliance attribute of the microwave oven. In this case, when an article is placed into the microwave oven, it may be predicted that Company B's retort-pouch food will have been placed.

Figure 11:
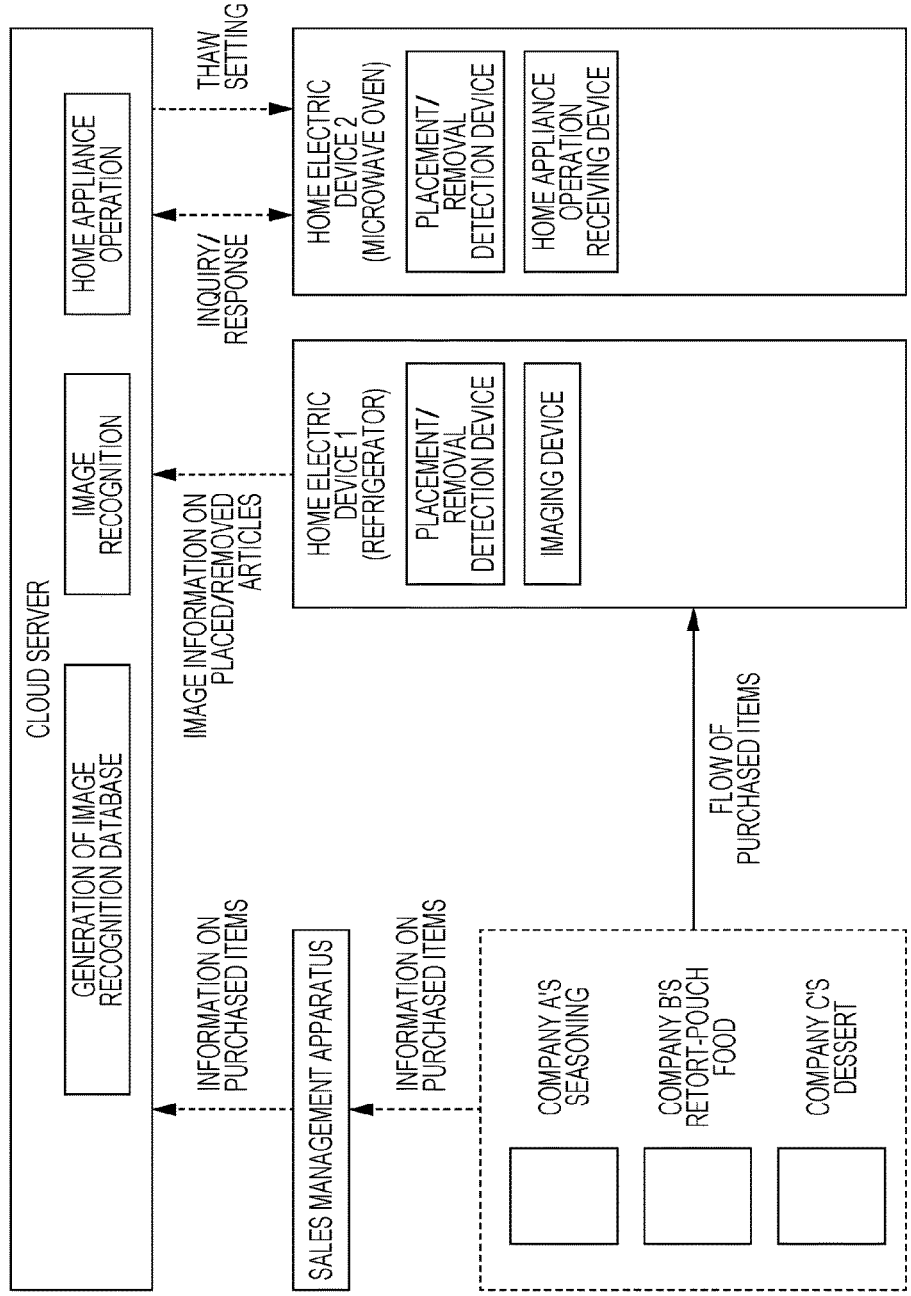
FIG. 11 is a diagram illustrating a configuration and processing flow in a modification/application of the present disclosure.

In addition, a control command or the like may be sent to a home electric device using a recognition result obtained using processing on the cloud server side. For example, as in FIG. 11, in the case where placement and removal of Company B's retort-pouch food into and from the microwave oven are detected immediately after Company B's retort-pouch food has been recognized in a home electric device 1 (refrigerator), control (transmission of a control command) such as home appliance settings for the thawing of Company B's retort-pouch food may be performed.

Figure 12:
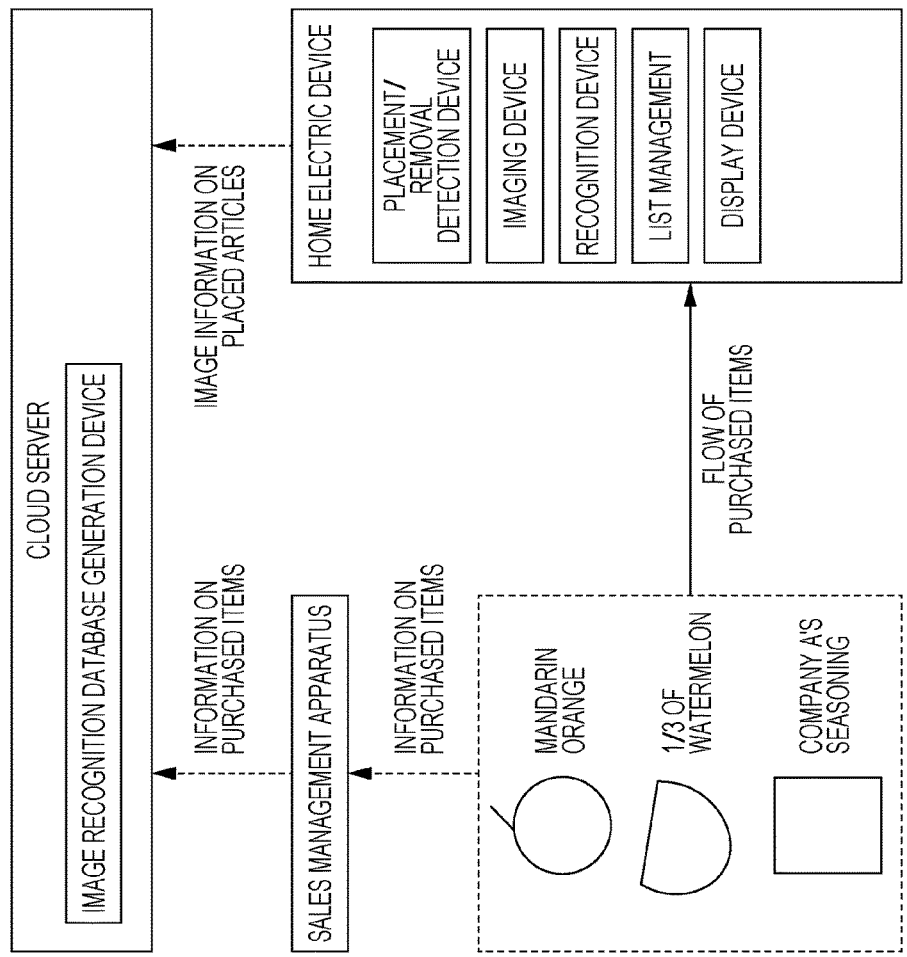
FIG. 12 is a diagram illustrating a configuration and processing flow in a modification/application of the present disclosure.

Furthermore, the processes described above may be performed either on the home electric device side or on the cloud server side. For example, as in FIG. 12 and FIG. 13, all the processes after image recognition may be performed on the home electric device side.

While image recognition has been described in all the exemplary embodiments described above by way of example, recognition is not intended to be limited to that based on images. For example, speech recognition may be used. In the case of speech recognition, for example, there are methods such as a method in which, when removing an article from the refrigerator, a user enters "remove mandarin orange" by audio. In this case, a description is given taking, for example, FIG. 3 as an example. A speech recognition database includes only "mandarin orange, ⅓ of watermelon, and Company A's seasoning", and it is only required to match the three words in the database with the audio input from the user, that is, "remove mandarin orange", resulting in high speech recognition accuracy being obtained.

Furthermore, while image recognition has been described with respect to a method for matching based on feature values of an object, such as size and color, the present disclosure is not intended to be limited to these image recognition methods. For example, an image itself or a luminance distribution in an image may simply undergo pattern matching.

The present disclosure can be used in a wide range of applications other than the application described in the actual embodiment. For example, the present disclosure is also applicable to crime-prevention services in a home delivery service. A cloud server is held and managed by a home-delivery service provider, and has a database regarding home-delivery persons who deliver items to customers' homes. A sales management apparatus is managed in a home-delivery station, and inputs a home-delivery schedule of which customer's house and which home-delivery person to visit on a certain day to the cloud server. A home electric device is installed in a customer's home, and, at the time of visit of a home-delivery person, acquires a face image or the like of the home-delivery person and sends an inquiry to the cloud server about it. The cloud server checks whether the home-delivery person is authentic, on the basis of the acquired face image of the home-delivery person and the home-delivery schedule input from the sales management apparatus in the home-delivery station, and a result is displayed on a terminal that is also installed in the customer's home. In the cloud server, it is assumed that only several home-delivery persons who are likely to be in charge of delivery on that date among many home-delivery persons are listed as recognition targets. This can increase recognition accuracy on the home electric device side. The mechanism described above allows a criminal pretending to be a home-delivery provider to be displayed as inauthentic, achieving an advantage in that crime can be prevented.

INDUSTRIAL APPLICABILITY

An information processing system of the present disclosure makes it possible to identify an article used in a home electric device. It is also possible to establish a crime-deterrent system with a home electric device by using an image recognition technique.

The invention claimed is:

1. An information processing system comprising:
a receiver that receives, from a point of sale (POS) system via a network, information on an article scanned at the POS system; and
a processor that generates, based on the received information on the article, a recognition database that temporarily stores the received information on the article,
wherein the article is associated with a home electric device equipped with an image recognition system, and
wherein, when the article is placed in the home electric device,
the image recognition system captures an image of the article,
the home electric device transmits the image of the article to perform a matching process, and
the information processing system performs the matching process of the image of the article against the information temporarily stored in the recognition database, and identifies the article placed in the home electric device based on the matching process.

2. The information processing system according to claim 1, wherein the recognition database is generated based on an image of the article or an image of an item processed or packaged similarly to the article.

3. The information processing system according to claim 1, wherein the information processing system identifies the article used in the home electric device by using image recognition.

4. The information processing system according to claim 1, wherein the information processing system selects a method for the matching process in accordance with the information on the article.

5. The information processing system according to claim 1, wherein the article is a purchased item, and is associated with the home electric device by using a personal ID, the personal ID including member information of a purchaser.

6. The information processing system according to claim 1, wherein association of the article with the home electric device is determined by reading, with the home electric device, a unique ID issued from the POS system at a time of purchase of the article.

7. The information processing system according to claim 1, wherein the recognition database includes, for each article, attribute information indicating one or more home electric devices available for use by the article and use information indicating in which home device the article has been previously used, and wherein the information processing system identifies, by using the attribute information and the use information, the article placed in the home electric device.

8. The information processing system according to claim 1, wherein the information processing system further performs a recognition process or a recognition correction process based on article-use detection information provided by a plurality of home electric devices.

9. An information processing system comprising:
a receiver that receives, from a point of sale (POS) system via a network, information on an article purchased via the POS system; and
a processor that generates, based on the received information on the purchased article, a prediction database that temporarily stores the received information on the purchased article,
wherein the information on the purchased article includes association information indicating an association of the purchased article with a target home electric device among a plurality of available home electric devices, and
wherein, when the purchased article is placed in the target home electric device,
the information processing system predicts identity of the purchased article placed in the target home electric device, based on the association information temporarily stored in the prediction database.

10. The information processing system according to claim 9, wherein the information processing system provides, to the home electric device or to another relevant home electric device, a home appliance control command related to the purchased article used in the target home electric device.

* * * * *